US012577939B2

(12) United States Patent
Kabus et al.

(10) Patent No.: US 12,577,939 B2
(45) Date of Patent: Mar. 17, 2026

(54) MODULAR NACELLE WITH STORABLE SUPPORT ASSEMBLY FOR SUPPORTING WIND TURBINE COMPONENTS AND RELATED METHODS

(71) Applicant: Vestas Wind Systems A/S, Aarhus N. (DK)

(72) Inventors: Simon Kabus, Viborg (DK); Pedro Miguel Correia Cavaco, Senhora da Hora (PT); Arvindh Malathi, Chennai (IN)

(73) Assignee: Vestas Wind Systems A/S, Aarhus N. (DK)

( * ) Notice: Subject to any disclaimer, the term of this patent is extended or adjusted under 35 U.S.C. 154(b) by 28 days.

(21) Appl. No.: 18/719,314

(22) PCT Filed: Dec. 1, 2022

(86) PCT No.: PCT/DK2022/050254
§ 371 (c)(1),
(2) Date: Jun. 13, 2024

(87) PCT Pub. No.: WO2023/116999
PCT Pub. Date: Jun. 29, 2023

(65) Prior Publication Data
US 2025/0059952 A1      Feb. 20, 2025

(30) Foreign Application Priority Data

Dec. 22, 2021    (IN) .............................. 202111059964
Feb. 9, 2022    (DK) ........................... PA 2022 70051

(51) Int. Cl.
F03D 13/10            (2016.01)
(52) U.S. Cl.
CPC ........ F03D 13/116 (2023.08); F05B 2230/60 (2013.01)

(58) Field of Classification Search
CPC .......... F03D 1/101; F03D 1/141; F03D 1/165; F03D 1/188; F03D 13/116; F03D 80/80; F05B 2240/14; F05B 2260/30
See application file for complete search history.

(56) References Cited

U.S. PATENT DOCUMENTS

2017/0363071 A1    12/2017  Baun et al.

FOREIGN PATENT DOCUMENTS

EP        2604851 A2    6/2013
EP        3276169 A1    1/2018
(Continued)

OTHER PUBLICATIONS

Danish Patent and Trademark Office, technical examination issued in corresponding DK Application No. PA 2022 70051. Dated Aug. 15, 2022.

(Continued)

*Primary Examiner* — Courtney D Heinle
*Assistant Examiner* — Danielle M. Christensen
(74) *Attorney, Agent, or Firm* — Wood Herron & Evans LLP

(57)            ABSTRACT
A main nacelle unit (22) for forming a nacelle (14) of a wind turbine (10) includes a main housing (28) having an outer wall (30*a*, 30*b*) and containing a base frame (52) configured to be attached to a tower (12) of the wind turbine (10). The main nacelle unit (22) also includes at least one support frame (56) configured to support a wind turbine component (54) external to the main housing (28). A portion of the support frame (56) is attached to the base frame (52) and movable between a stored position and a deployed position. In the stored position, the portion of the support frame (56) is configured to be positioned within the confines of the main housing (28), and in the deployed position, the portion of the support frame (56) is configured to extend through the main (Continued)

housing outer wall (30*a*, 30*b*) to support the wind turbine component (54) external to the main housing (28). A method of assembling a wind turbine using the support assembly is also disclosed.

25 Claims, 12 Drawing Sheets

(56)                References Cited

FOREIGN PATENT DOCUMENTS

| WO | 2011117005 | A2 | 9/2011 | | |
| WO | 2021094565 | A1 | 5/2021 | | |
| WO | 2021098929 | A1 | 5/2021 | | |
| WO | 2021098930 | A1 | 5/2021 | | |
| WO | 2021098931 | A1 | 5/2021 | | |
| WO | WO-2021098927 | A1 * | 5/2021 | ............ | F03D 13/10 |
| WO | 2021164831 | A1 | 8/2021 | | |

OTHER PUBLICATIONS

International Searching Authority, International Search Report and Written Opinion issued in corresponding PCT Application No. PCT/DK2022/050254, dated Mar. 23, 2023.

\* cited by examiner

MODULAR NACELLE WITH STORABLE SUPPORT ASSEMBLY FOR SUPPORTING WIND TURBINE COMPONENTS AND RELATED METHODS

TECHNICAL FIELD

This invention relates generally to wind turbines, and more particularly to a modular nacelle of a wind turbine having a storable support assembly for supporting wind turbine components of the nacelle, and to a method of assembling a wind turbine using such a storable support assembly.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a plurality of blades and supported in the nacelle by means of a shaft. The shaft couples the rotor either directly or indirectly with a generator, which is housed inside the nacelle. Consequently, as wind forces the blades to rotate, electrical energy is produced by the generator. Wind turbines may be located either on a land mass (on-shore) or within a body of water (offshore).

As electrical energy demands have increased over the past years, the size of wind turbines have also increased so that they may produce additional electrical energy. As the wind turbines increase in size, the physical dimensions and weight of the wind turbine components also increase. As the size and weight of the wind turbine components increase, transporting the wind turbine components from the manufacturing facility to the assembly site becomes increasingly challenging. To meet this challenge, the nacelle of a wind turbine may be constructed from one or more modules that contain one or more wind turbine components. The individual modules may be attached to one another to form the nacelle.

One must carefully consider how to arrange those modules so that the loads, in particular in the form of torque, do not require massive towers and yaw assemblies that are difficult and costly to manufacture, transport, and assemble. One approach is to arrange a main nacelle unit having a base plate around the yaw assembly and have auxiliary nacelle units attached to the sides of the main unit to form the nacelle. The auxiliary nacelle units may be pre-loaded with wind turbine components from the manufacturing facility or at the wind turbine installation site. The auxiliary nacelle units carrying the wind turbine components may then be lifted and attached to the sides of the main nacelle unit at the top of the tower using, for example, a suitable crane. Attaching the auxiliary nacelle units to the sides of the main nacelle unit may be challenging as the weight of the auxiliary nacelle units increases and the height of the wind turbines increases. Moreover, the sides of the main nacelle unit may not be strong enough to carry the weight of the auxiliary nacelle unit, including the wind turbine components contained therein, which may weigh several tonnes.

It may be seen that what is needed is an improved method and apparatus for attaching the auxiliary nacelle units to the main nacelle unit and supporting the weight of the auxiliary nacelle units and the wind turbine components contained therein. Preferably, the invention alleviates, mitigates, or eliminates one or more of the above or other disadvantages singly or in any combination.

SUMMARY

In a first aspect of the invention, a main nacelle unit for forming a nacelle of a wind turbine is disclosed. The main nacelle unit includes a main housing, having at least one main housing outer wall and containing a base frame configured to be attached to a tower of the wind turbine, and a support assembly including at least one support frame configured to support a wind turbine component external to the main housing. At least a portion of the at least one support frame is attached to the base frame and movable between a stored position and a deployed position. In the stored position, the at least a portion of the at least one support frame is configured to be positioned within the confines of the main housing. In the deployed position, the at least a portion of the at least one support frame is configured to extend through the at least one main housing outer wall to support the wind turbine component external to the main housing.

In one embodiment, the at least one support frame includes a support block attached to the base frame and a link arm also attached to the base frame. The at least one support frame may further include a cross strut having a first end and a second end, wherein when the at least a portion of the at least one support frame is in the deployed position, the first end of the cross strut is configured to be attached to the support block, and the second end of the cross strut is configured to engage the wind turbine component external to the main housing. Furthermore, the link arm may be configured to be attached to the cross strut adjacent the second end. In one embodiment, the second end of the cross strut includes a recess configured to engage the wind turbine component.

In one embodiment, the portion of the at least one support frame that is attached to the base frame and movable between the stored position and the deployed position may include the support block. In this embodiment, the support block may be configured to be coupled to the wind turbine component external to the main housing when in the deployed position. Moreover, in one embodiment, the support block may be pivotally attached to the base frame so that, for example, the support block may be movable between the stored position and the deployed position. The at least one support frame may further include one or more elongate fasteners each having a first end and a second end, wherein when the at least a portion of the at least one support frame is in the deployed position, the fastener is configured to extend through the base frame, through the support block, and into the wind turbine component. The first end of the fastener is configured to be coupled to the base frame, and the second end of the fastener is configured to be coupled to the wind turbine component.

In addition to the above or alternatively, the at least a portion of the at least one support frame that is attached to the base frame and movable between the stored position and the deployed position may include the link arm. In one embodiment, the link arm may be pivotally attached to the base frame so that, for example, the link arm may be movable between the stored position and the deployed position. In one embodiment, the at least one support frame may further include a support bracket mounted to the base frame, wherein the link arm is attached to the support bracket. In this embodiment, the link arm may be configured to be attached to the support block when the at least a portion of the at least one support frame is in the stored position. In one embodiment, for example, the support block may include a mounting bracket configured to receive the first end of the cross strut, and the link arm may be configured to be attached to the mounting bracket when the at least a portion of the at least one support frame is in the stored position.

In one embodiment, the support assembly may include a plurality of support frames to support the wind turbine component external to the main housing. For example, the plurality of support frames may be discrete frames that are spaced apart from each other. In an exemplary embodiment, the support assembly may include two support frames for supporting the wind turbine component external to the main housing.

In a second aspect of the invention, a nacelle of a wind turbine is disclosed. The nacelle includes the main nacelle unit according to the first aspect and an auxiliary nacelle unit attached to the main nacelle unit. The auxiliary nacelle unit includes an auxiliary housing having at least one auxiliary housing outer wall and which contains the wind turbine component therein. In the deployed position, the at least a portion of the at least one support frame extends through the at least one auxiliary housing outer wall to support the wind turbine component that is in the auxiliary nacelle unit. In one embodiment, the support assembly may be configured to support substantially all of the weight of the wind turbine component. In this way, for example, the weight of the wind turbine component is directly connected to the base plate in the main nacelle unit and not supported through the connection between the main nacelle unit and auxiliary nacelle unit. In one embodiment, the wind turbine component being supported by the support assembly includes a transformer, for example.

In a third aspect of the invention, a wind turbine is disclosed that includes the nacelle according to the second aspect.

In yet a fourth aspect of the invention, a method of erecting a wind turbine is disclosed. The method includes providing the main nacelle unit according to the first aspect and providing an auxiliary nacelle unit including an auxiliary housing having at least one auxiliary housing outer wall, the auxiliary housing containing the wind turbine component. The method further includes moving the at least a portion of the at least one support frame from the stored position to the deployed position and coupling the at least one support frame to the wind turbine component in the auxiliary nacelle unit.

In one embodiment, coupling the at least one support frame to the wind turbine component may further include extending one or more elongate fasteners through the base frame, through the at least one support frame, and into the wind turbine component, coupling a first end of the fasteners to the base frame and coupling a second end of the fasteners to the wind turbine component. In one embodiment, assembly technicians may install the fasteners while positioned on the inner side of the base plate in the main nacelle unit.

In one embodiment, the method may further include hoisting the main nacelle unit to a top of a wind turbine tower, hoisting the auxiliary nacelle unit to the top of the wind turbine tower, and connecting the main nacelle unit to the wind turbine tower. In one embodiment, the moving step and coupling step may occur prior to hoisting the main nacelle unit and the auxiliary nacelle unit to the top of the wind turbine tower. In a second embodiment, however, the moving step may occur before or after hoisting the main nacelle unit, and the coupling step may occur after hoisting the main nacelle unit and the auxiliary nacelle unit to the top of the wind turbine tower. In one embodiment, the method may further include connecting the main nacelle unit and the auxiliary nacelle unit together. This connection may be made before or after hoisting the main nacelle unit and auxiliary nacelle unit to the top of the tower.

In one embodiment, coupling the at least one support frame to the wind turbine component may further include coupling the at least one support frame to the wind turbine component so that the at least one support frame supports substantially all of the weight of the wind turbine component. In one embodiment, the method may further include attaching the at least a portion of the at least one support frame to the base frame at a manufacturing site, positioning the at least a portion of the at least one support frame in the stored position, and transporting the main nacelle unit from the manufacturing site to a wind turbine installation site while the at least a portion of the at least one support frame is in the stored position. Once at the wind turbine installation site, however, the at least a portion of the at least one support frame may be moved to the deployed position, as noted above.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
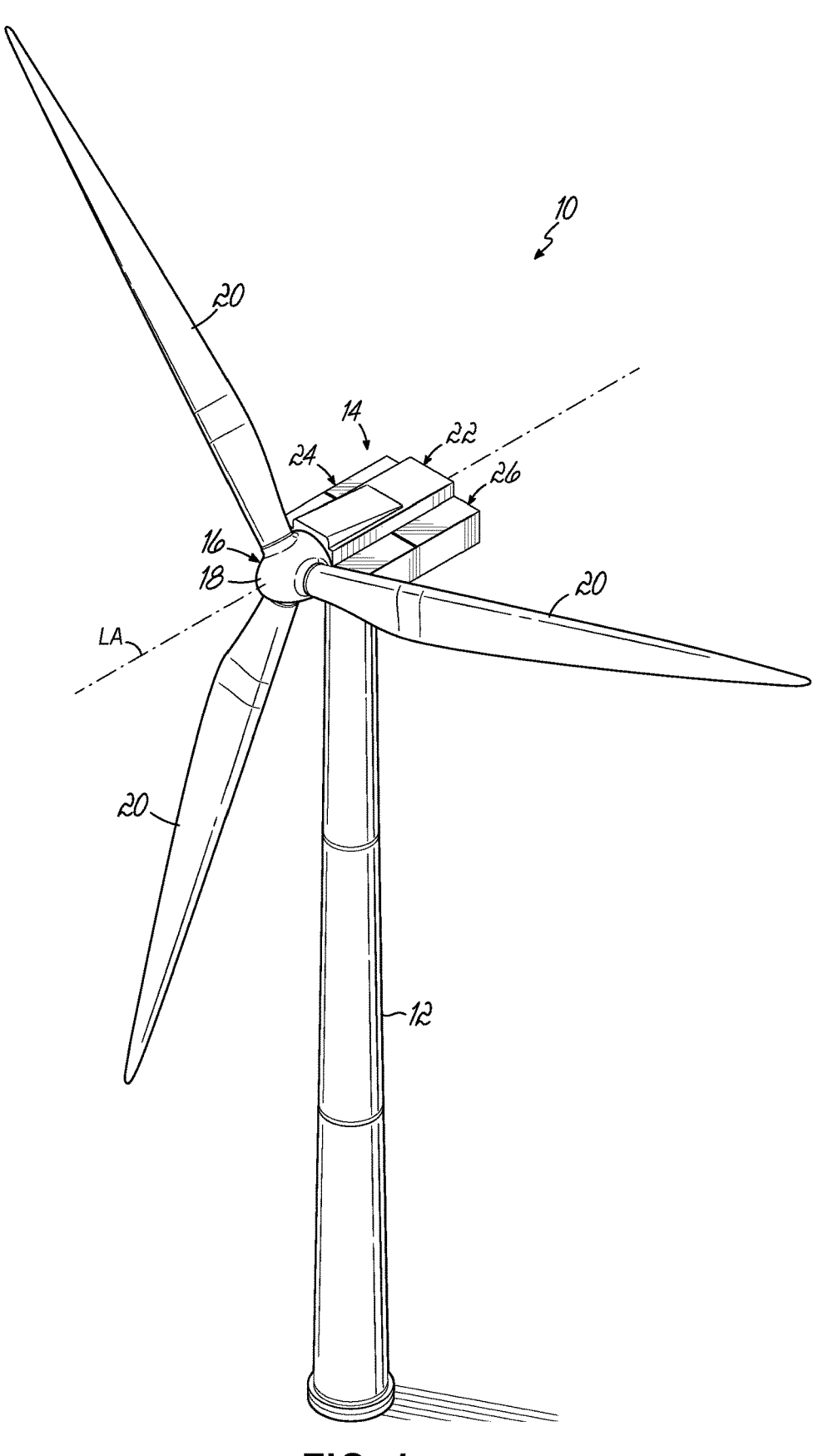
FIG. 1 is a perspective view of a wind turbine having a nacelle including a main nacelle unit and two auxiliary nacelle units attached to the side of the main nacelle unit.

Referring to FIG. 1, a wind turbine 10 includes a tower 12, a nacelle 14 disposed at the apex of the tower 12, and a rotor 16 operatively coupled to a generator (not shown) housed inside the nacelle, and a gearbox (not shown) also housed inside the nacelle 14. In addition to the generator and gearbox, the nacelle 14 may house various components needed to convert wind energy into electrical energy and to operate and optimize the performance of the wind turbine 10. The tower 12 supports the load presented by the nacelle 14, rotor 16, and other wind turbine components housed inside the nacelle 14 and operates to elevate the nacelle 14 and rotor 16 to a height above ground level or sea level, as may be the case, at which air currents having lower turbulence and higher velocity are typically found. The nacelle 14 defines a longitudinal axis LA and is configured to align its longitudinal axis LA with the direction of the incoming wind during the operation of the wind turbine.

The rotor 16 may include a central hub 18 and a plurality of blades 20 attached to the central hub 18 at locations distributed about the circumference of the central hub 18. In the representative embodiment, the rotor 16 includes three blades 20, however the number may vary. The blades 20, which project radially outward from the central hub 18, are configured to interact with passing air currents to produce rotational forces that cause the central hub 18 to spin about its longitudinal axis. The design, construction, and operation of the blades 20 are familiar to a person having ordinary skill in the art of wind turbine design and may include additional functional aspects to optimize performance. For example, pitch angle control of the blades 20 may be implemented by a pitch control mechanism (not shown) responsive to wind velocity to optimize power production in low wind conditions, and to feather the blades if wind velocity exceeds design limitations.

The rotor 16 may be coupled to the gearbox directly or indirectly via by a drive shaft (not shown). Either way, the gearbox transfers the rotation of the rotor 16 through a coupling (not shown) to the generator. Wind exceeding a minimum speed may activate the rotor 16, causing the rotor 16 to rotate in a direction substantially perpendicular to the wind, applying torque to the input shaft of the generator. The electrical power produced by the generator may be supplied to a power grid (not shown) or an energy storage system (not shown) for later release to the grid as understood by a person having ordinary skill in the art. In this way, the kinetic energy of the wind may be harnessed by the wind turbine 10 for power generation.

Figure 2:
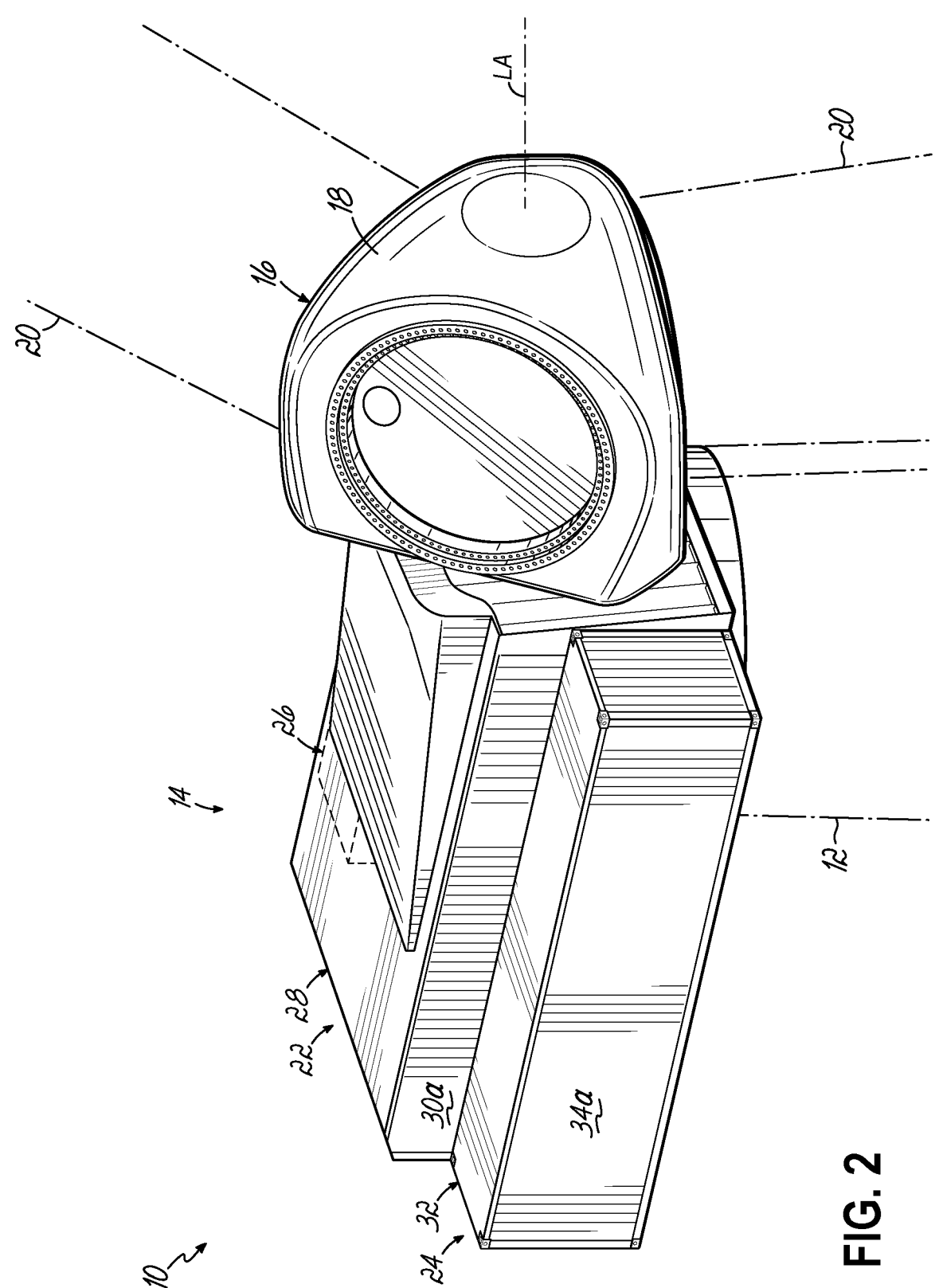
FIG. 2 is a close-up, perspective view of the nacelle in FIG. 1.

Referring to FIGS. 1 and 2, the nacelle 14 is formed from a main nacelle unit 22 and two auxiliary nacelle units 24, 26, which are removably affixed to the sides of the main nacelle unit 22. In one embodiment, the main nacelle unit 22 may be hoisted up and placed at the apex of the tower 12 using, for example, a large crane or the like. The auxiliary nacelle units 24, 26 may then be hoisted one at a time and attached to opposite sides of the main nacelle unit 22 to form the nacelle 14. In an alternative embodiment, one or both auxiliary nacelle units 24, 26 may be connected to the main nacelle unit 22 and then that assembly hoisted to the top of the tower 12.

Figure 3:
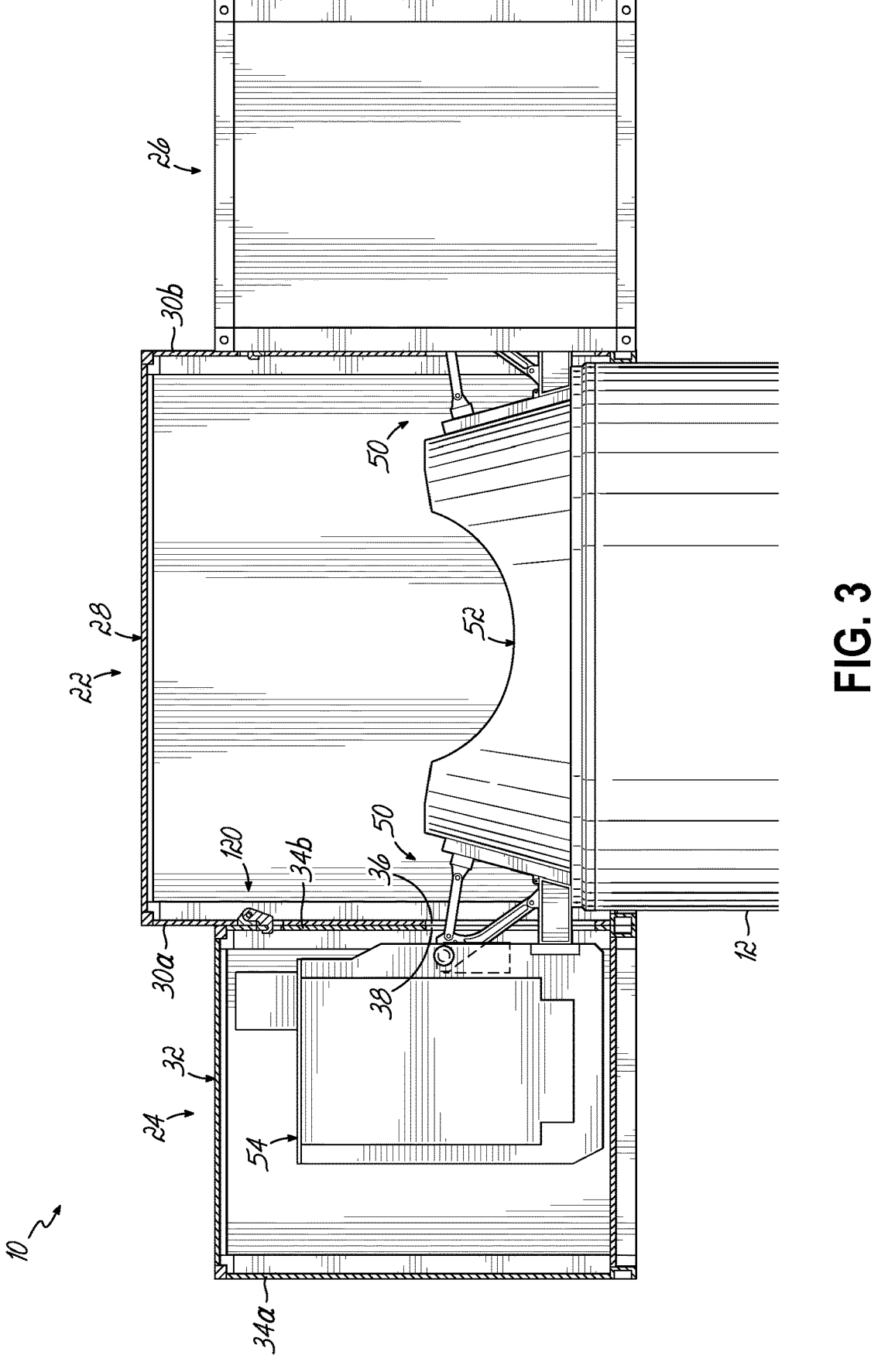
FIG. 3 is a partial cross-section view of the main nacelle unit and the two auxiliary nacelle units in FIG. 1.

Referring to FIG. 3, the main nacelle unit 22 includes a main housing 28 with opposing main housing outer walls 30a, 30b. The auxiliary nacelle unit 24 includes an auxiliary housing 32 with opposing auxiliary housing outer walls 34a, 34b. Each of the main housing outer walls 30a, 30b has an opening 36 and auxiliary housing outer wall 34b has a corresponding opening 38 aligned with the opening 36 when the auxiliary nacelle unit 24 is connected to the main nacelle unit 22.

Figure 4:
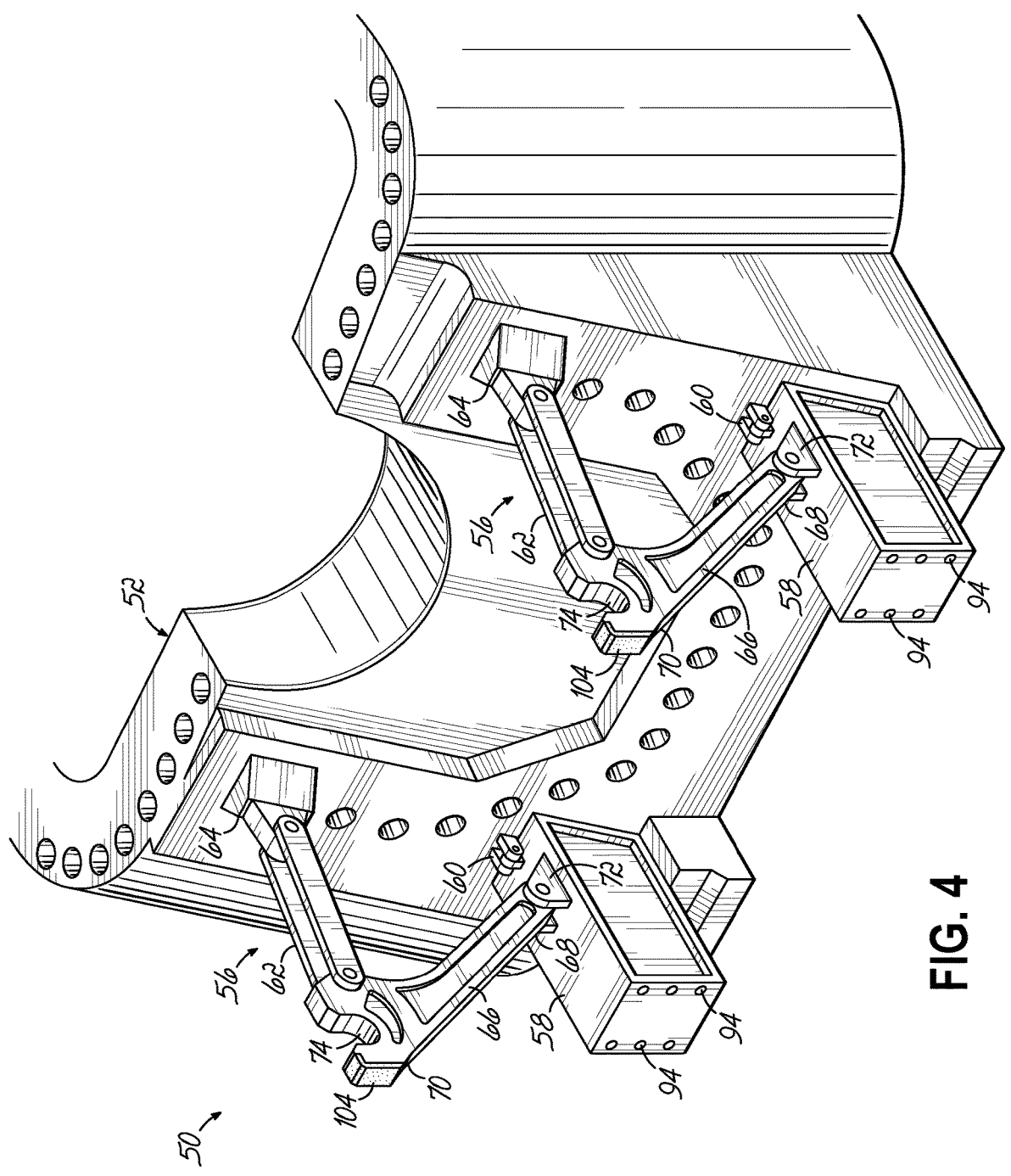
FIG. 4 is a perspective view of a support assembly connected to the base frame in the main nacelle unit according to one embodiment of the invention.

Referring to FIGS. 3 and 4, a support assembly 50 according to an embodiment of the invention is depicted affixed to a base frame 52 that is disposed within the main nacelle unit 22. As illustrated in FIG. 3, the support assembly 50 is supporting a wind turbine component 54, such as a transformer, a converter, or switch gear, which is positioned in the auxiliary nacelle unit 24, i.e., external to the main housing 28 of the main nacelle unit 22. The wind turbine component 54 is positioned above the floor of the auxiliary housing 32 such that substantially all of the weight of the wind turbine component 54 is supported by the support assembly 50 and transmitted to the base frame 52. In this way, the weight of the wind turbine component 54 is not borne by the housings 28, 32 of the main nacelle unit 22 and auxiliary nacelle unit 24, respectively, but instead the weight of the wind turbine component 54 has a direct load path to the base plate 52 in the main nacelle unit 22.

With particular reference to FIG. 4, the support assembly 50 includes a plurality of support frames 56 (two shown). Each support frame 56 includes a support block 58 pivotably connected to the base frame 52 via a lug 60. The support frame 56 also includes a link arm 62 which is pivotally attached to an optional support bracket 64 which is mounted to the base frame 52. The support frame 56 also includes a cross strut 66 with a first end 68 and second end 70. The first end 68 is removably attached to a mounting bracket 72 mounted on the support block 58. The link arm 62 is removably attached to the cross strut 66 adjacent the second end 70. The second end 70 includes a recess 74 that is configured to engage the wind turbine component 54 as illustrated in FIG. 3. While FIG. 4 shows two support frames 56, additional support frames 56 may be added to the support assembly 50 as may be needed to support larger and/or heavier wind turbine components 54 in the auxiliary nacelle unit 24.

Figure 5:
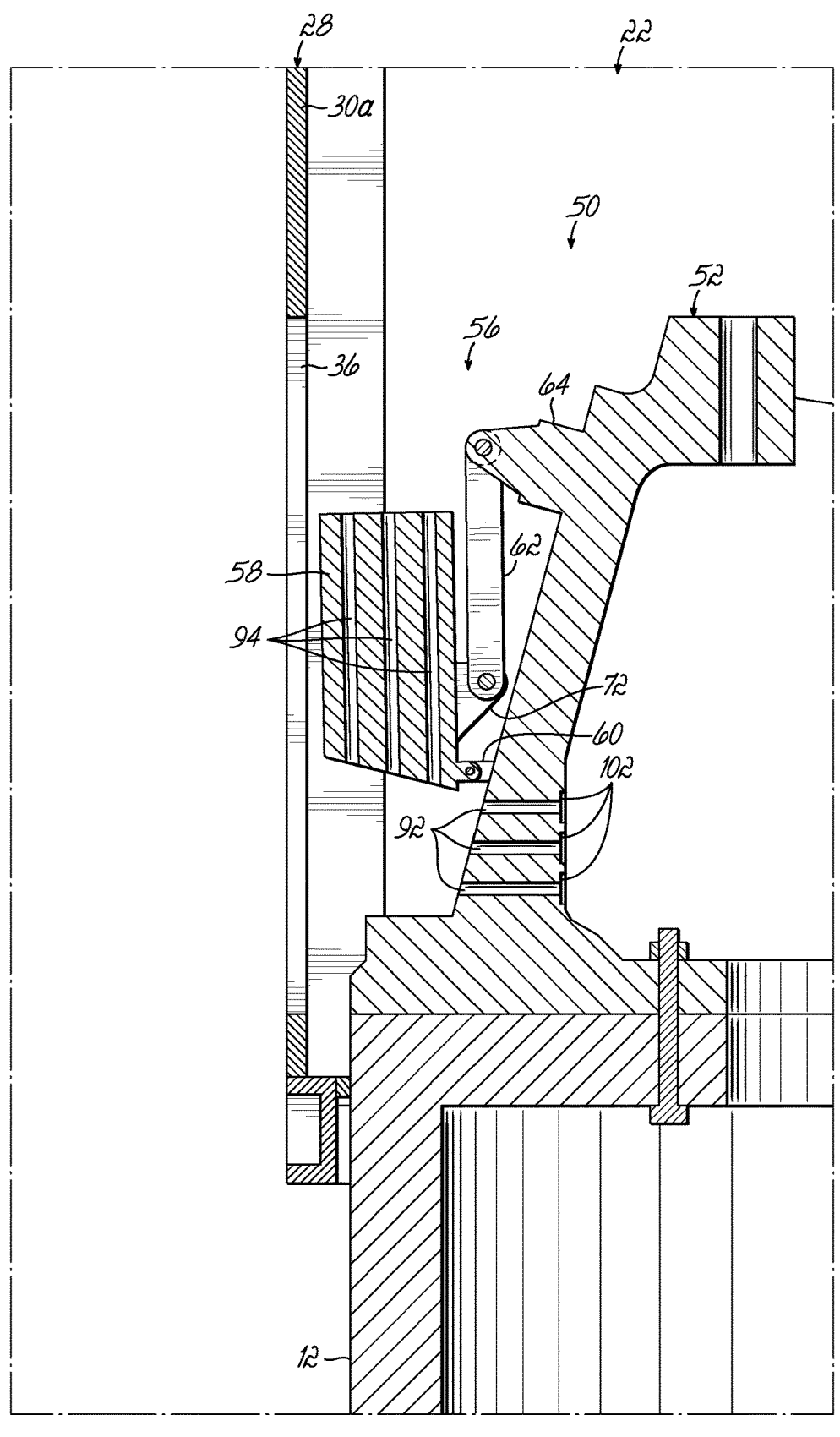
FIG. 5 is a partial, cross-sectional, elevational view of the support assembly in FIG. 4 with at least a portion of the support assembly in a stored position.
Figure 6:
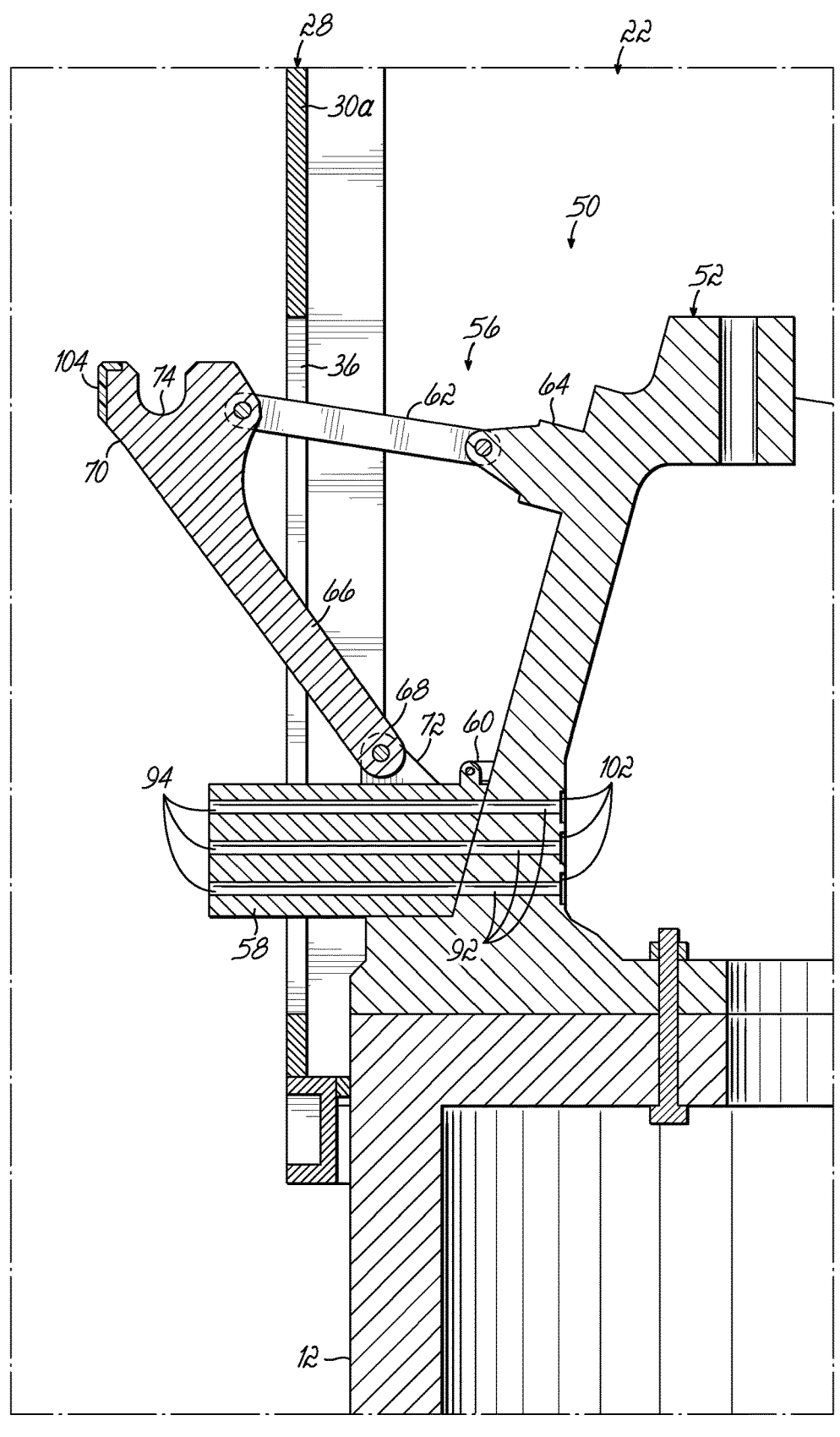
FIG. 6 is a partial, cross-sectional, elevational view of the support assembly in FIG. 4 in a deployed position.

In one embodiment, at least a portion of the support assembly 50 is movable between a stored position (FIG. 5) and a deployed position (FIG. 6). To move from the deployed position to the stored position, the cross strut 66 may be removed from the support block 58 and the link arm 62, the support block 58 pivoted upwardly about lug 60, and the free end of the link arm 62 connected to the mounting bracket 72 on the support block 58. Moving from the stored position to the deployed position is essentially a reverse of these steps. The cross strut 66 may be stored in the main nacelle unit 22 until the cross strut 66 is needed to put the support assembly 50 in the deployed position. As depicted in FIG. 5, when the support assembly 50 is in the stored position, the support assembly 50 is positioned within the confines of the main housing 28. For example, no component of the support assembly 50 extends through the opening 36 in the main housing outer wall 30a. In the deployed position, at least a portion of the support assembly 50 extends through the opening 36 in the main housing outer wall 30a as depicted in FIG. 6.

In one embodiment, the support assembly 50 may be attached to the base frame 52 at the manufacturing site when the base frame 52 is placed in the main nacelle unit 22. The support assembly 50 may be placed in the stored position for transport from the manufacturing site to the installation site. The cross strut 66 may be placed inside the main nacelle unit 22 and also transported from the manufacturing site to the installation site. In another embodiment, the support assembly 50 may be attached to the base frame 52 at the installation site, either before the main nacelle unit 22 is lifted atop the tower 12 or after the main nacelle unit 22 is attached to the top of the tower 12.

In the embodiment described above, the recess 74 for supporting the wind turbine component 54 was in the second end 70 of the cross strut 66 and the link arm 62 was connected to the cross strut 66 adjacent its second end. In an alternative embodiment (not shown), however, the recess may be part of the end of the link arm instead of being part of the second end of the cross strut. In this alternative embodiment, in the stored position, the link arm may be removed from the support frame (instead of the cross strut 66), the support block may be pivoted upwardly similar to that above, and the second end of the cross strut may be connected to the support bracket 64. Thus, it should be appreciated that the support frame may have some variations but remain within the scope of the present disclosure.

Figure 7:
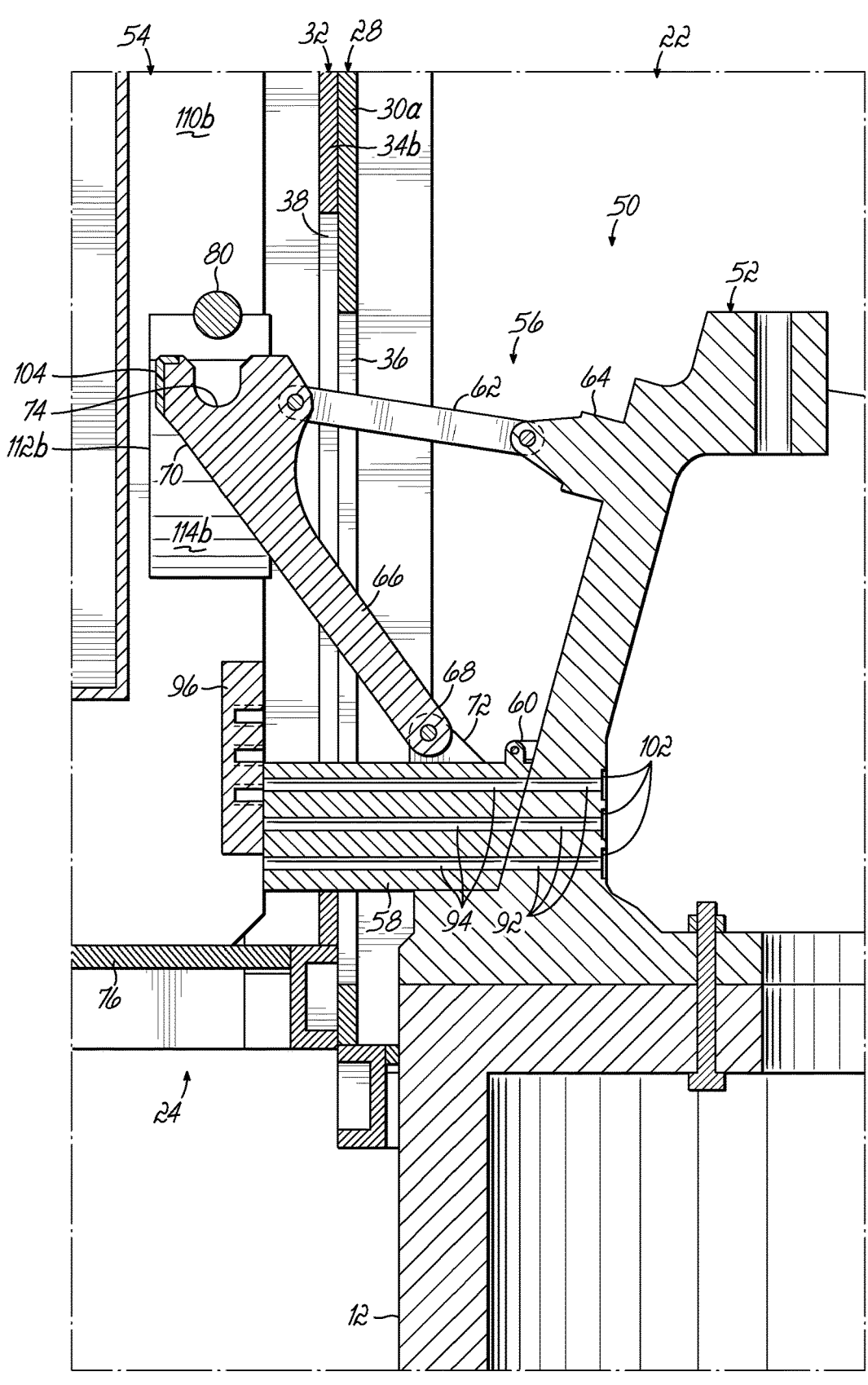
FIG. 7 is a cross-sectional, elevational view depicting the auxiliary nacelle unit being lowered so the support assembly may engage a wind turbine component in the auxiliary nacelle unit.
Figure 8:
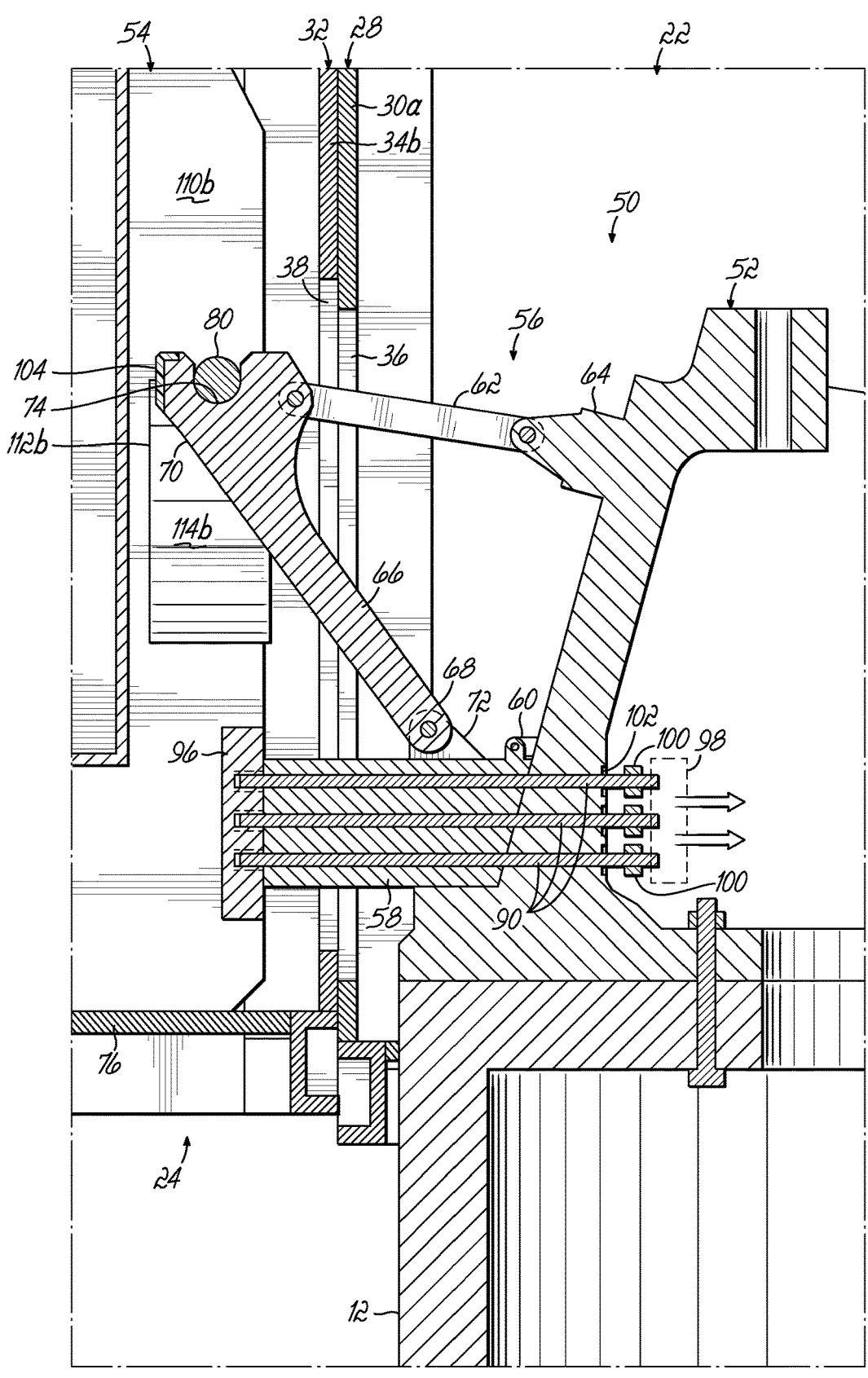
FIG. 8 is a cross-sectional, elevational view depicting the support assembly engaging the wind turbine component and a support block being connected to the base frame in the main nacelle unit.

FIGS. 7-10 depict sequence whereby the auxiliary nacelle unit 24 is positioned such that the support assembly 50 engages/supports the wind turbine component 54 positioned in the auxiliary nacelle unit 24. First, FIG. 7 depicts the auxiliary nacelle unit 24 adjacent to the main nacelle unit 22 and being lowered downwardly with the support assembly 50 being in the deployed position. In this configuration, at least a portion of the support block 58, the cross strut 66, and the link arm 62 extends through opening 36 in main housing outer wall 30a and through opening 38 in auxiliary housing outer wall 34b. In FIG. 7, the wind turbine component 54 is resting on a floor 76 of the auxiliary housing 32. Second, FIG. 8 depicts the auxiliary nacelle unit 24 lowered further down such that the recess 74 of the cross strut 66 engages a support member 80, such as a rod or pin, for example, that is connected to the wind turbine component 54. The recess 74 helps to support the wind turbine component 54.

Figure 9:
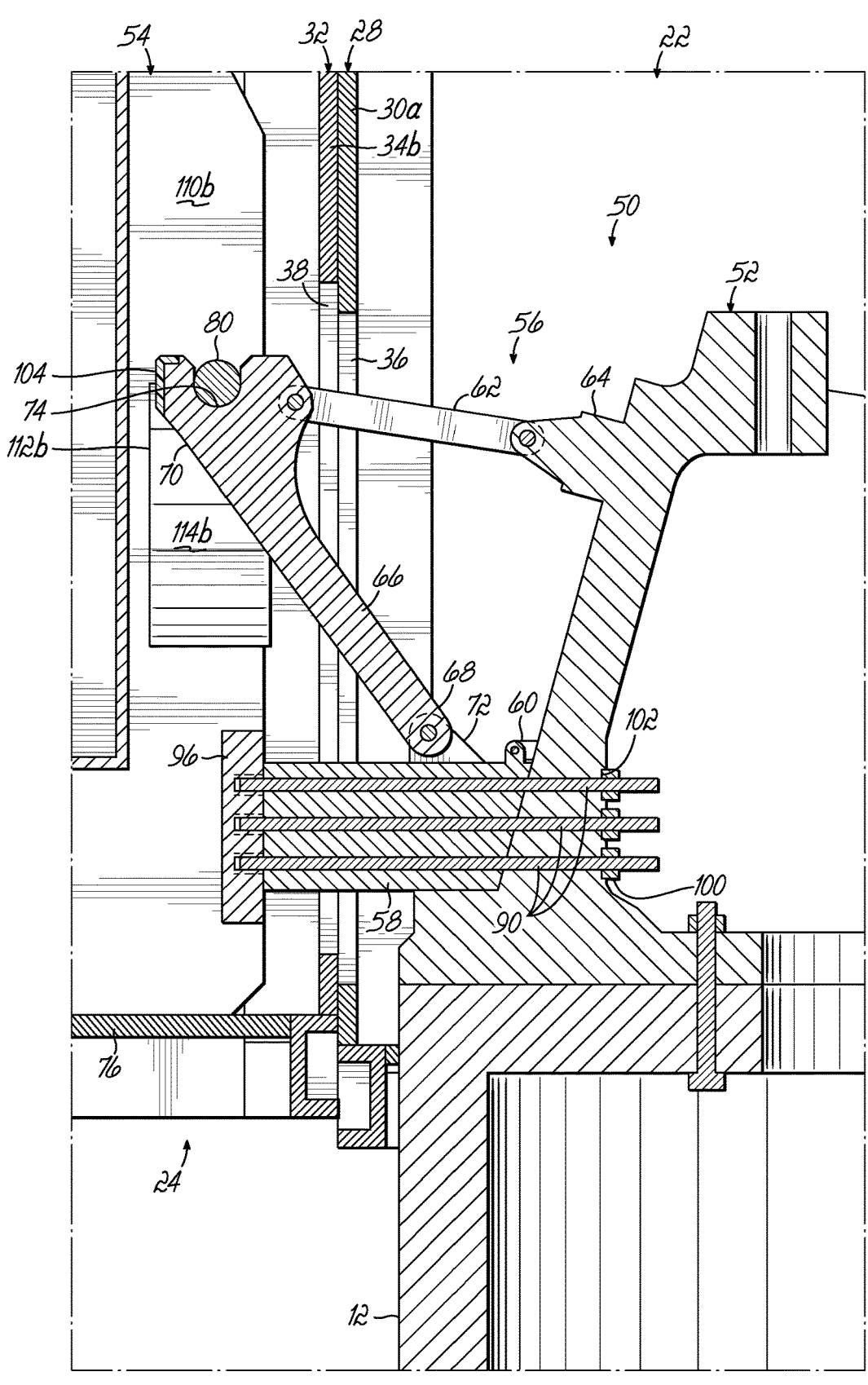
FIG. 9 is a cross-sectional, elevational view depicting the support assembly fully connected to the base frame in the main nacelle unit.

FIG. 8 also illustrates a plurality of elongate fasteners 90 inserted through a plurality of holes or channels 92 (FIG. 7) in the base frame 52 and through a plurality of holes or channels 94 (FIG. 7) in the support block 58. The fasteners 90 threadingly engage a receiving bracket 96 which is connected to the wind turbine component 54. To secure the fasteners 90 between the base frame 52 and the receiving bracket 96, the fasteners 90 may be pretensioned by a tensioning device 98 and then the nuts 100 are tightened on the fasteners 90 until the nuts 100 contact engagement surfaces 102 on the base frame 52 (as depicted in FIG. 9) and the tensioning device 98 is removed. In this regard, the fasteners 90 may be inserted and fastened (as described above) by service or assembly technicians located in the main nacelle unit 22, and more particularly, by service technicians located on the inner side of the base plate 52. This arrangement may provide a number of benefits. For example, the arrangement allows service technicians to make the connection or disconnection (in the event of a replacement of the wind turbine component 54) between the support frames 56 and the wind turbine component 54 from only one side, i.e., the side in the main nacelle unit 22. Thus, for example, service technicians do not have to be near the wind turbine component 54 during the connection/disconnection thereof. Moreover, the main nacelle unit 22 may provide more room for service technicians to work as compared to the auxiliary nacelle unit 24, which can have limited space for service technicians.

Figure 10:
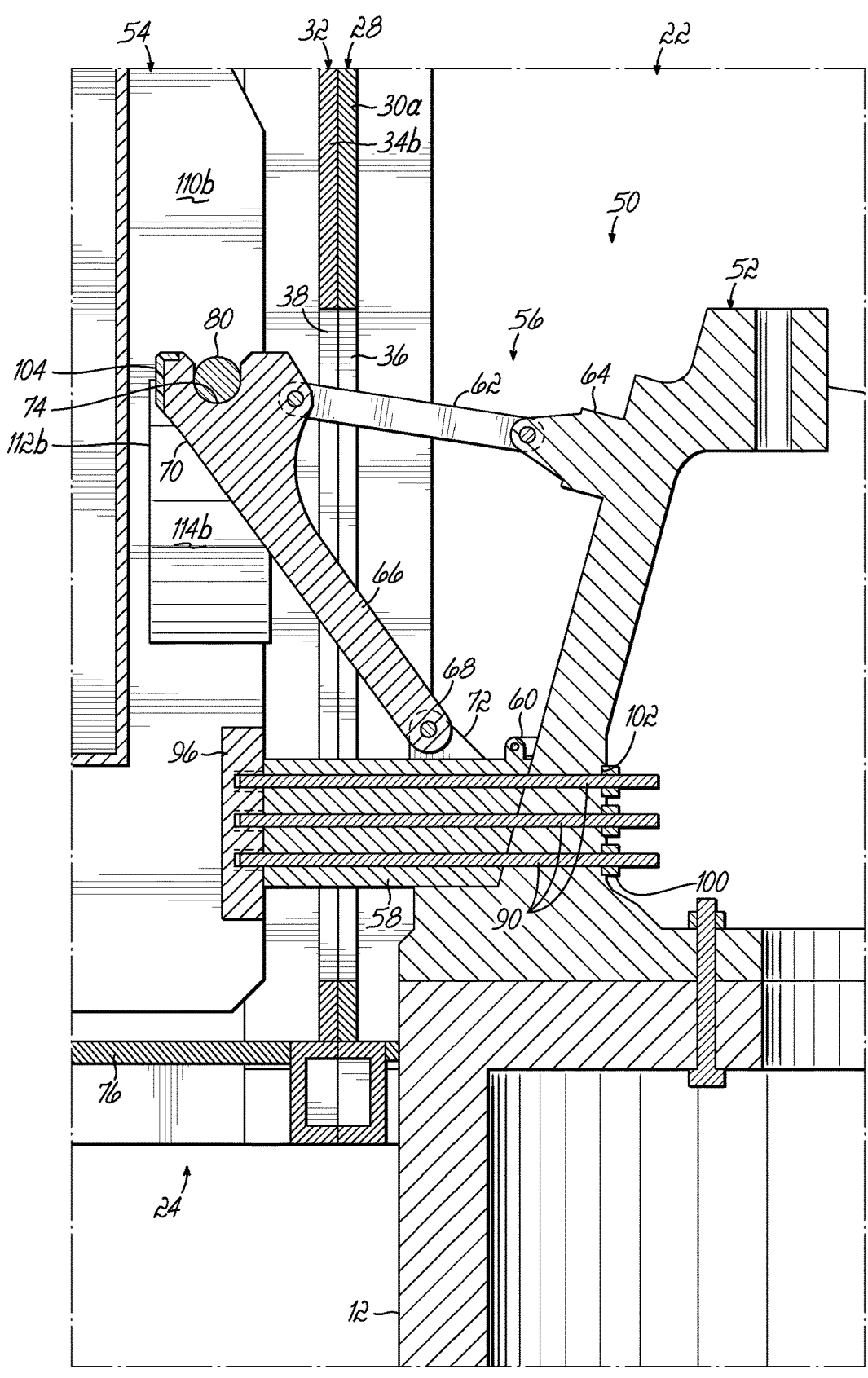
FIG. 10 is a cross-sectional, elevational view of the auxiliary nacelle unit in its fully down position and the support assembly fully supporting the wind turbine component.

Finally, FIG. 10 depicts the auxiliary nacelle unit 24 lowered further such that the wind turbine component 54 is fully suspended by the support assembly 50 and no longer contacts the floor 76 of the auxiliary housing 32. In this configuration, the support assembly 50 supports substantially all of the weight of the wind turbine component 54 with that weight being transmitted to the base frame 52. The second end 70 of the cross strut 66 may include a shock absorbing element 104 to mitigate any surface marring or sudden jarring should the second end 70 abruptly contact that wind turbine component 54. In one embodiment, the shock absorbing element 104 may be a spring-loaded device. Alternatively, the shock absorbing element 104 may include an elastic material, such as rubber or the like.

Figure 11:
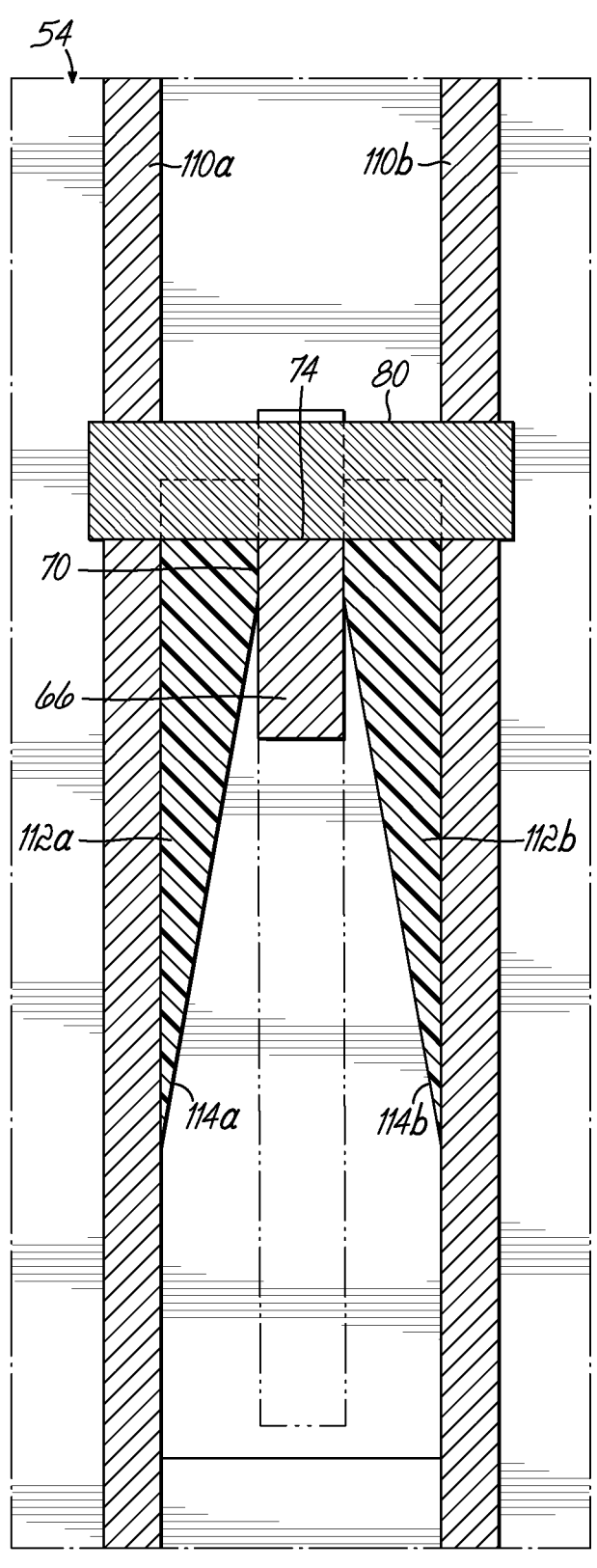
FIG. 11 is an elevational view of the wind turbine component with tapered guides to guide the cross strut onto a support pin on the wind turbine component.

Referring to FIGS. 7, 10, and 11, the support member 80 may extend between two spaced-apart, vertical-oriented ribs 110a, 110b. During the process of lowering the wind turbine component 54 downwardly so the support member 80 may engage with recess 74 of the cross strut 66, the second end 70 of the cross strut 66 should be substantially aligned between the spaced-apart ribs 110a, 110b. To assist with aligning the cross strut 66, guides 112a, 112b may be positioned on the spaced-apart ribs 110a, 110b best illustrated in FIG. 11. Each of the guides 112a, 112b has a tapered section 114a, 114b that cooperated with each other to funnel or guide the cross strut 66 toward the center of the support member 80. By guiding the cross strut 66 with the guides 112a, 112b, the lateral position of the auxiliary nacelle unit 24 may be set with some precision relative to the main nacelle unit 22 during the assembly of the nacelle 14.

Figure 12A:
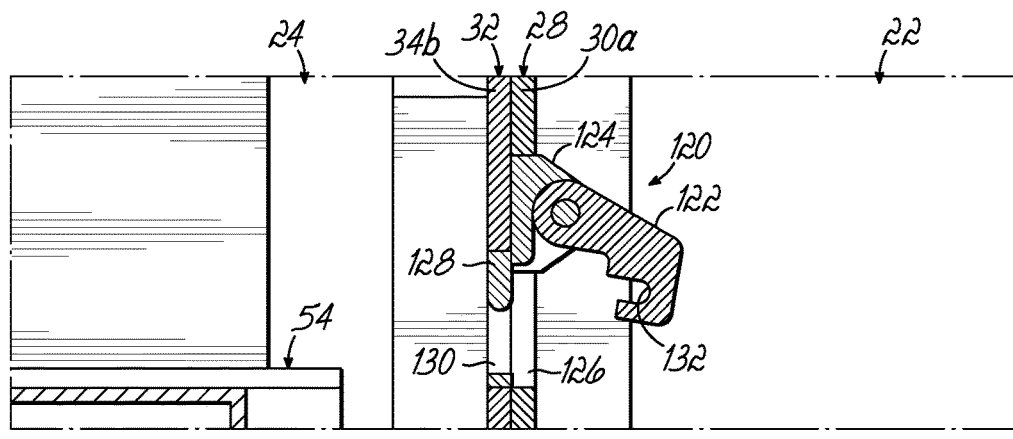
FIGS. 12A-12C depict a sequence whereby a hook mechanism on the main nacelle unit is deployed to engage a section of the side wall of the auxiliary nacelle unit when the auxiliary nacelle unit is in the fully down position.
Figure 12B:
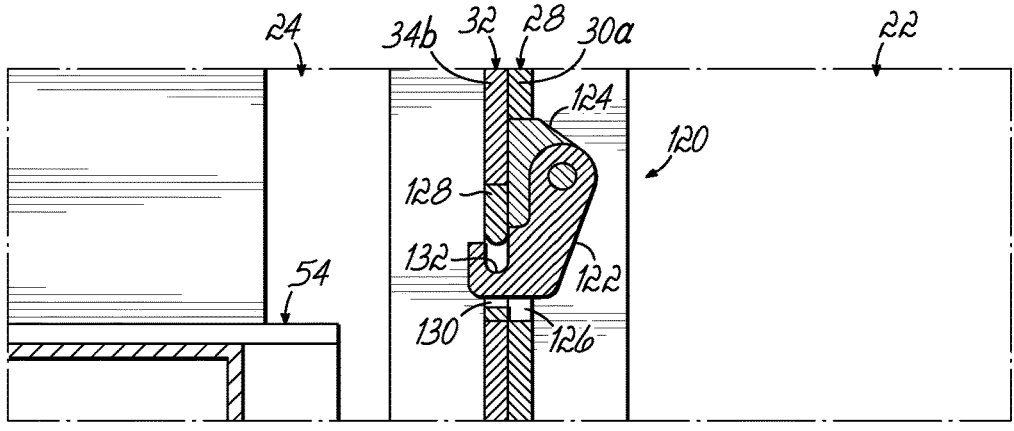
Figure 12C:
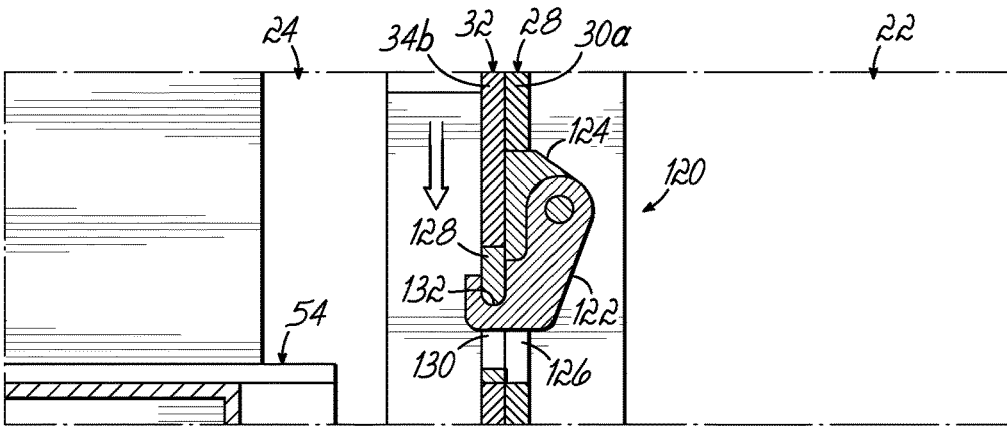

FIG. 3 depicts the auxiliary nacelle units 24, 26 attached to the main nacelle unit 22. An attachment mechanism 120 may be used to attach the auxiliary nacelle units 24, 26 to the main nacelle unit 22. To that end, FIGS. 12A-12C depict a sequence whereby the attachment mechanism 120 is used to attach the auxiliary nacelle unit 24 to the main nacelle unit 22. The attachment mechanism 120 includes a latch 122 pivotally connected to a support bracket 124, which is attached to the main housing outer wall 30a. The main housing outer wall 30a includes an opening 126 which is configured to allow the latch 122 to pass a least partially therethrough as depicted in FIG. 12B. FIG. 12C depicts the auxiliary nacelle unit 24 being lowered down until a retention edge 128 in an opening 130 of the auxiliary housing outer wall 34b is captured in a recess 132 in latch 122. In this configuration, the attachment mechanism 120 may support the auxiliary nacelle unit 24. A plurality of attachment mechanisms 120 may be arranged along the side of the main nacelle unit 22 to support the top of the auxiliary nacelle unit 24. In addition, one more attachment mechanism 120 may be arranged at the bottom of the main nacelle unit 22 to support the bottom of the auxiliary nacelle unit 24. Notably, because the heavy components in the auxiliary nacelle units 24 are being supported by the support assemblies 50 and the base plate 52 in the main nacelle unit 22, the support path for the wind turbine components 54 does not have to go through the walls of housings 28, 32. Thus, the walls of the housings 28, 32 and the attachment mechanisms 120 may be designed to accommodate smaller loads.

The invention also contemplates a method of erecting the wind turbine 10. The method includes moving the support frames 56 from the stored position (FIG. 5) to the deployed position (FIG. 6) and coupling the support frames 56 to the wind turbine component 54. As discussed above, the support frames 56 support substantially all of the weight of the wind turbine component 54. More particularly, the method includes extending the fasteners 90 through the base frame 52, through the support block 58, and threadingly engaging the receiving bracket 96 on the wind turbine component 54 and attaching nuts 100 to secure it to the base frame 52. The method may further include hoisting the main nacelle unit 22 to the top of the tower 12, hoisting the auxiliary nacelle unit 24 to the top of the tower 12 and connecting the main nacelle unit 22 to the tower 12.

In one embodiment, the support frames 56 may be moved from the stored position to the deployed position and coupled to the wind turbine component 54 prior to hoisting the main nacelle unit 22 and the auxiliary nacelle unit 24 to the top of the tower 12. In another embodiment, coupling the support frames 56 to the wind turbine component 54 may occur after hoisting the main nacelle unit 22 and the auxiliary nacelle unit 24 to the top of the tower 12.

In one embodiment, the method includes attaching the support frames 56 to the base frame 52 at a manufacturing site, positioning the support frames 56 in the stored position, and transporting the main nacelle unit 22 from the manufacturing site to the wind turbine installation site with the support frames 56 in the stored position. Once at the installation site, the support frame 56 may be moved from the stored position to the deployed position in accordance with the method described above.

While the method above described the wind turbine component 54 being preloaded into the auxiliary nacelle unit 24 before it is lifted to the main nacelle unit 22, other methods may be possible. For example, in an alternative embodiment, one or more (lighter weight) wind turbine components may be preloaded into the auxiliary nacelle unit 24, and then the auxiliary nacelle unit 24 lifted up and attached to the side of the main nacelle unit 22. When the auxiliary nacelle unit 24 is attached, however, none of these preloaded wind turbine components are supported by the support assembly 50. Next, another (heavy) wind turbine component 54, such as a transformer, may be lifted up separately and lowered through a hatch in the roof of the auxiliary nacelle unit 24, or the roof of the auxiliary nacelle unit may be removed and the wind turbine component 54 lowered through the open top of the auxiliary nacelle unit 24.

That separate wind turbine component 54 may then be lowered so as to be connected with and supported by the support assembly 50 in the same manner as discussed above. In other words, the at least one support frame 56 will support essentially all of the weight of that separate wind turbine component 54 much like as depicted in FIG. 10. Similarly, should the supported wind turbine component 54 need to be replaced or serviced on the ground, that wind turbine component 54 may be lifted off the support assembly 50 and through the hatch or removed roof without having to lower the entire auxiliary nacelle unit 24.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A main nacelle unit for forming a nacelle of a wind turbine, comprising:
   a main housing having at least a main housing outer wall and containing a base frame configured to be attached to a tower of the wind turbine; and
   a support assembly including at least one support frame configured to support a wind turbine component external to the main housing, wherein at least a portion of the at least one support frame is directly attached to the base frame and movable between a stored position and a deployed position,
   wherein in the stored position, the at least a portion of the at least one support frame is configured to be positioned within the confines of the main housing, and
   wherein in the deployed position, the at least a portion of the at least one support frame is configured to extend through the main housing outer wall to support the wind turbine component external to the main housing.

2. The main nacelle unit of claim 1, wherein the at least one support frame comprises:
   a support block attached to the base frame; and
   a link arm attached to the base frame.

3. The main nacelle unit of claim 2, wherein the at least one support frame further comprises a cross strut having a first end and a second end, wherein when the at least a portion of the at least one support frame is in the deployed position:
   the first end of the cross strut is configured to be attached to the support block,
   the second end of the cross strut is configured to engage the wind turbine component external to the main housing, and
   the link arm is configured to be attached to the cross strut adjacent the second end.

4. The main nacelle unit of claim 3, wherein the second end of the cross strut includes a recess configured to engage the wind turbine component.

5. The main nacelle unit of claim 2, wherein the at least a portion of the at least one support frame includes the support block, and wherein the support block is configured to be coupled to the wind turbine component external to the main housing when in the deployed position.

6. The main nacelle unit of claim 2, wherein the support block is pivotally attached to the base frame.

7. The main nacelle unit of claim 2, wherein the at least one support frame further comprises an elongate fastener having a first end and a second end, wherein when the at least a portion of the at least one support frame is in the deployed position:
   the fastener is configured to extend through the base frame, through the support block, and into the wind turbine component,
   the first end of the fastener is configured to be coupled to the base frame, and
   the second end of the fastener is configured to be coupled to the wind turbine component.

8. The main nacelle unit of claim 2, wherein the at least a portion of the at least one support frame includes the link arm.

9. The main nacelle unit of claim 2, wherein the link arm is pivotally attached to the base frame.

10. The main nacelle unit of claim 2, wherein the at least one support frame further comprises a support bracket mounted to the base frame, and wherein the link arm is attached to the support bracket.

11. The main nacelle unit of claim 2, wherein the link arm is configured to be attached to the support block when the at least a portion of the at least one support frame in the stored position.

12. The main nacelle unit of claim 11, wherein the support block includes a mounting bracket configured to receive the first end of the cross strut, and wherein the link arm is configured to be attached to the mounting bracket when the at least a portion of the at least one support frame is in the stored position.

13. A main nacelle unit for forming a nacelle of a wind turbine, comprising:

a main housing having at least a main housing outer wall and containing a base frame configured to be attached to a tower of the wind turbine; and a support assembly including at least one support frame configured to support a wind turbine component external to the main housing, wherein at least a portion of the at least one support frame is attached to the base frame and movable between a stored position and a deployed position, wherein in the stored position, the at least a portion of the at least one support frame is configured to be positioned within the confines of the main housing, wherein in the deployed position, the at least a portion of the at least one support frame is configured to extend through the main housing outer wall to support the wind turbine component external to the main housing, and wherein the support assembly comprises at least two support frames configured to support the wind turbine component external to the main housing.

14. A nacelle of a wind turbine, comprising:

a main nacelle unit for forming a nacelle of a wind turbine, comprising:

a main housing having at least a main housing outer wall and containing a base frame configured to be attached to a tower of the wind turbine; and a support assembly including at least one support frame configured to support a wind turbine component external to the main housing, wherein at least a portion of the at least one support frame is attached to the base frame and movable between a stored position and a deployed position, wherein in the stored position, the at least a portion of the at least one support frame is configured to be positioned within the confines of the main housing, wherein in the deployed position, the at least a portion of the at least one support frame is configured to extend through the main housing outer wall to support the wind turbine component external to the main housing; and an auxiliary nacelle unit attached to the main nacelle unit and comprising an auxiliary housing having at least an auxiliary housing outer wall, the auxiliary housing containing the wind turbine component, wherein the at least a portion of the at least one support frame extends through the auxiliary housing outer wall to support the wind turbine component.

15. The nacelle of claim 14, wherein the at least one support frame supports substantially all of the weight of the wind turbine component.

16. The nacelle of claim 14, wherein the wind turbine component includes a transformer.

17. A wind turbine comprising the nacelle according to claim 14.

18. A method of erecting a wind turbine, comprising:

providing a main nacelle unit for forming a nacelle of a wind turbine, comprising:

a main housing having at least a main housing outer wall and containing a base frame configured to be attached to a tower of the wind turbine; and a support assembly including at least one support frame configured to support a wind turbine component external to the main housing, wherein at least a portion of the at least one support frame is attached to the base frame and movable between a stored position and a deployed position, wherein in the stored position, the at least a portion of the at least one support frame is configured to be positioned within the confines of the main housing, and wherein in the deployed position, the at least a portion of the at least one support frame is configured to extend through the main housing outer wall to support the wind turbine component external to the main housing;

providing an auxiliary nacelle unit comprising an auxiliary housing having at least an auxiliary housing outer wall, the auxiliary housing containing the wind turbine component;

moving the at least a portion of the at least one support frame from the stored position to the deployed position; and coupling the at least one support frame to the wind turbine component.

19. The method of claim 18, wherein coupling the at least one support frame to the wind turbine component further comprises:

extending an elongate fastener through the base frame, through the at least one support frame, and into the wind turbine component;

coupling a first end of the fastener to the base frame; and coupling a second end of the fastener to the wind turbine component.

20. The method of claim 18, further comprising:

hoisting the main nacelle unit to a top of a wind turbine tower;

hoisting the auxiliary nacelle unit to the top of the wind turbine tower; and connecting the main nacelle unit to the wind turbine tower.

21. The method of claim 20, wherein the moving step and coupling step occur prior to hoisting the main nacelle unit and the auxiliary nacelle unit to the top of the wind turbine tower.

22. The method of claim 20, wherein the coupling step occurs after hoisting the main nacelle unit and the auxiliary nacelle unit to the top of the wind turbine tower.

23. The method of claim 18, further comprising connecting the main nacelle unit and the auxiliary nacelle unit together.

24. The method of claim 18, wherein coupling the at least one support frame to the wind turbine component further comprises coupling the at least one support frame to the wind turbine component so that the at least one support frame supports substantially all of the weight of the wind turbine component.

25. The method of claim 18, further comprising:

attaching the at least a portion of the at least one support frame to the base frame at a manufacturing site;

positioning the at least a portion of the at least one support frame in the stored position; and transporting the main nacelle unit from the manufacturing site to a wind turbine installation site while the at least a portion of the at least one support frame is in the stored position.

* * * * *